United States Patent [19]

Hall

[11] 3,899,611

[45] Aug. 12, 1975

[54] CURING BY ACTINIC RADIATION

[75] Inventor: Roger P. Hall, Middleburgh Hts., Ohio

[73] Assignee: SCM Corporation, Cleveland, Ohio

[22] Filed: Oct. 19, 1973

[21] Appl. No.: 408,244

Related U.S. Application Data

[63] Continuation-in-part of Ser. No. 255,365, May 22, 1972, abandoned.

[52] U.S. Cl. ........ 427/54; 204/159.15; 204/159.16; 204/159.23; 204/159.24; 260/21; 260/395 B; 260/834; 260/837 R; 260/855; 260/856; 428/443; 428/502; 428/524; 428/528
[51] Int. Cl.² ........................ C08F 8/00; B05C 5/00
[58] Field of Search ....... 260/856, 837; 240/159.15, 240/159.10, 159.17, 159.23

[56] References Cited
UNITED STATES PATENTS

| | | | |
|---|---|---|---|
| 2,824,851 | 2/1958 | Hall | 260/836 |
| 3,047,532 | 7/1962 | D'Alelio | 204/159.15 |
| 3,056,760 | 10/1962 | D'Alelio | 204/159.15 |
| 3,483,105 | 12/1969 | D'Alelio | 204/159.15 |
| 3,485,733 | 12/1969 | D'Alelio | 204/159.15 |
| 3,644,161 | 2/1972 | Hall | 260/856 |

FOREIGN PATENTS OR APPLICATIONS

| | | | |
|---|---|---|---|
| 211,109 | 1/1957 | Australia | 260/856 |
| 628,150 | 8/1949 | United Kingdom | 260/856 |

*Primary Examiner*—Richard B. Turer
*Attorney, Agent, or Firm*—Merton H. Douthitt; James B. Wilkens

[57] ABSTRACT

Methods are disclosed for rapidly curing compositions containing acrylyl terminated prepolymers and unsaturated diluents with melamine acrylate cross-linking agents by exposure to actinic radiation. The compositions also contain a polymerization initiator which is sensitive to the radiation employed.

4 Claims, No Drawings

CURING BY ACTINIC RADIATION

RELATED APPLICATIONS

This application is a continuation-in-part of application Ser. No. 255,365, filed May 22, 1972, now abandoned, the disclosure of which is incorporated herein by reference. This application is also related to commonly assigned application Ser. No. 255,696 filed May 22, 1972, entitled CURING BY IONIZING PARTICLE RADIATION.

DESCRIPTION OF THE INVENTION

This invention relates to the radiation curing of coatings on substrates, such as wood, glass, cloth, metal, paper, plastic, cement, concrete block, cinder block, and the like, and more particularly, to organic coatings prepared by polymerizing unsaturated polymeric materials on a workpiece surface using actinic radiation.

In the manufacture of metal, plastic, wood, and ceramic products for industrial and domestic use, such as vinyl or vinyl-asbestos type plastic floor tiles, appliance and automotive parts, molds for pouring cement and other applications, a protective organic coating is applied to the surfaces of the product which is to be exposed to wear. Such coatings must be extremely hard and tough to withstand repeated abrasion and abuse without cracking. In the case of the floor tile application, the coatings must be chemically durable and stain-resistant and avoid yellowing upon exposure to harsh cleaning fluids and sunlight. Furthermore, this coating must resist curling or at least not enhance the curling tendency inherent in many floor tile compositions. The term "curling" refers to the tendency of floor tile to warp upon exposure to moisture.

The materials which are employed for such coating applications are generally heat-curable resinous materials which are applied in the form of a solution or dispersion in a volatile organic solvent. The wet-coated product is passed through an oven in which hot air is circulated to evaporate the solvent and to cure the coating material to the required hardness. This form of coating application is relatively slow and substantial amounts of vaporized solvents are often released to the surroundings. Accordingly, the art is continually seeking methods for increasing the speed of coating formation while minimizing the release of organic materials.

One of the methods which has been proposed to increase the speed at which a substrate can be coated is to apply a layer of suitable thickness of an unsaturated monomeric material or mixtures thereof to the substrate surface whereupon the layer is activated to react and form a cured polymeric coating by exposing the layer to actinic radiation, such as ultraviolet radiation having wave lengths of about 1,600 to 4,000 angstroms. The radiation activation is carried out at ambient temperatures and, because the action of the ultraviolet radiation is extremely rapid, the monomeric coating layer can be polymerized in a continuous fashion. Because no evaporation of solvent is required, polymeric coatings can be rapidly achieved.

Although a wide variety of unsaturated monomeric compounds have been proposed for use in forming polymeric coatings using actinic curing procedures, these compounds, when exposed to actinic radiation, do not always form hard, tough, stain-resistant, chemically durable, non-yellowing adherent coatings of the type which are required for plastic floor tile and the other applications mentioned above.

It is therefore an object of this invention to provide actinic radiation curing processes whereby a liquid coating composition is applied to a substrate and polymerized by actinic, especially ultraviolet, irradiation at room temperature without substantial solvent release to provide a smooth, tough, adherent, chemical and stain-resistant, heat-resistant, non-yellowing, non-curling protective and decorative coating.

In attaining the objects of this invention, one feature resides in applying to the substrate to be coated a thin film of an actinic radiation curable coating binder composition comprising the following components:

A. an acrylyl terminated prepolymer;

B. a melamine acrylate referred to herein as an alkyl acrylate melamine ether and comprising the transetherification reaction product of a lower alkoxymethyl melamine and a hydroxylalkyl acrylate or lower alkacrylate or the etherification reaction product of a methylol melamine and a hydroxyalkyl acrylate or lower alkacrylate;

C. an unsaturated, especially ethylenically unsaturated, polymerizable diluent or mixture of diluents which are polymerizable in the presence of a free-radical photoinitiator by actinic radiation; and D. an effective amount of an actinic radiation sensitive polymerization initiator.

For efficiency and economy in compounding coating formulations, component (A) is present in the proportion of about 10 to 70%; component (B) in the proportion of about 5 to 75%; component (C) in the proportion of about 0 to 75% and component (D) in the proportion of about 0.01 to 5%, by weight of the coating binder composition.

COMPONENT (A)

The term acrylyl terminated prepolymer refers to linear and branched acrylyl terminated monomers and oligomers having a molecular weight in the range of about 170 to about 30,000 which upon actinic irradiation in the presence of a suitable actinic radiation sensitive polymerization initiator convert to three-dimensional, cross-linked, insoluble, infusible polymers. The acrylyl groups can be pendent, as in a branched portion of the prepolymers such as where a low molecular weight acrylic copolymer containing acrylic acid residues has been postreacted with glycidyl acrylate or where an epoxy novolac resin has been reacted with acrylic acid. The acrylyl terminated prepolymers can also be diacrylyl terminated polyamides as disclosed in U.S. Pat. Nos. 3,470,079, 3,483,104, and 3,483,105; diacrylyl terminated polyesters as disclosed in U.S. Pat. Nos. 3,485,733, 3,455,801, 3,455,802, 3,485,732; diacrylyl vinyl ester resins prepared from polyfunctional organic acids, polyfunctional epoxides, polyfunctional isocyanates, or dicarboxylic acid esters of polyepoxides, polyamines, or polyisocyantes with 2-hydroxayalkyl acrylates or methacrylates as disclosed in U.S. Pat. No. 3,560,237, the disclosures of said patents being incorporated by reference. A number of these patents (e.g., U.S. Pat. No. 3,485,733 at Column 12, line 50) suggest the curing of diacrylyl prepolymers with triazines under the influence of high energy ionizing electromagnetic radiation, but do not suggest cross-linking with the melamine acrylates under actinic irradiation, as disclosed herein. U.S. Pat. No. 3,535,148 shows substituted amide formaldehyde derivatives of hydroxymethyl melamine cured by high energy ionizing radiation. These patents do not suggest the specific advantages realized by the present invention by curing the present coatings with the relatively low energy levels associated with curing by actinic radiation.

Representative classes of acrylyl terminated prepolymers that can be used in practicing the present invention include: acrylyl terminated ester or polyester prepolymers, urea acrylates, acrylyl terminated urethane prepolymers, acrylyl oils, acrylyl hydrocarbon resins, acrylyl terminated epoxy prepolymers, acrylyl terminated epoxy-ester prepolymer, acrylyl terminated amide-ester prepolymers, acrylyl terminated polyether prepolymers, acrylyl terminated hydrocarbon prepolymers, and generally any oligomers having two or more terminal or pendent acrylyl groups. In some instances, the presence of maleic or fumaric unsaturation in the acrylyl prepolymer or polymer is desirable. Specific acrylyl terminated prepolymers include: trimer fatty acid triacrylate prepolymers such as those formed by reacting one mole of a trimer fatty acid (e.g., a trimerized $C_{18}$ unsaturated fatty acid) with 3 moles of glycidyl acrylate; acrylyl terminated phthalic anhydride propylene glycol polyester prepolymers, such as those formed by reacting one mole of water with 14 moles of phthalic anhydride and 13 moles of propylene oxide and then reacting this polyester with 2 moles of glycidyl acrylate to form an acrylyl polyester prepolymer; acrylyl alkyd or polyester prepolymers, such as those prepared from a carboxyl-rich alkyd or polyester and glycidyl acrylate or from a hydroxyl-rich alkyd or polyester and acrylyl chloride; acrylyl maleic acid/epoxypolyester prepolymers, such as those formed by reacting 2 moles of 2-hydroxyethyl acrylate with 2 moles of maleic anhydride and then reacting this reaction product with one mole of bisphenol A diglycidyl ether; acrylyl adipic acid prepolymers, such as those formed by reacting one mole of adipic acid with 2 moles of glycidyl acrylate; acrylyl succinic acid ethylene glycol polyester prepolymers, such as formed by reacting 2 moles of 2-hydroxyethyl acrylate with 2 moles of succinic anhydride followed by reacting this product with one mole of ethylene glycol; urea acrylates such as those formed by the reaction of 2 moles of hydroxyethyl acrylate with one mole of bismethoxymethyl urea; acrylyl epoxy prepolymers, such as those formed by reacting 2 moles of 2-hydroxyethyl acrylate with one mole of a diglycidyl ether of bisphenol A; acrylyl maleic acid/ethylene glycol prepolymers, such as those formed by reacting 2 moles of 2-hydroxyethyl acrylate and 2 moles of maleic anhydride and then reacting this product with one mole ethylene glycol; acrylyl maleic prepolymers, such as those formed by the reaction of one mole of maleic acid with 2 moles of glycidyl acrylate; acrylyl maleic amide prepolymers, such as those formed by the reaction of 2 moles of maleic anhydride with one mole of ethylene diamine followed by subsequent reaction with 2 moles of glycidyl acrylate; acrylyl maleic amide prepolymers, such as those formed by the reaction of one mole of maleic anhydride and 2 moles of ethylene diamine followed by subsequent condensation with 2 moles of acrylyl chloride; acrylyl succinic amide prepolymers, such as those formed by the reaction of one mole of succinic anhydride with 2 moles of ethylene diamine followed by reaction with 2 moles of acrylyl chloride; acrylyl amide prepolymers, such as those formed by reacting 2 moles of formaldehyde with 2 moles of acrylamide followed by reaction with one mole of hexanediol; acrylyl urethane prepolymers, such as those formed by reacting 2 moles of toluene diisocyanate with one mole of triethylene glycol and then reacting this product with 2 moles of 2-hydroxyethyl acrylate; acrylyl urethane prepolymers, such as those formed by reacting 2 moles of isophorone diisocyanate with one mole of hexanediol and then reacting this product with 2 moles of 2-hydroxyethyl acrylate; acrylyl urethane prepolymers, such as those formed by reacting one mole of isophorone diisocyanate or toluene diisocyanate with 2 moles of 2-hydroxyethyl acrylate; acrylyl oils such as those formed by the reaction of two or more moles of acrylic acid with one mole of an epoxidized oil such as epoxidized soya or epoxidized linseed oil; acrylyl hydrocarbon resins, such as those formed by the reaction of two or more moles of acrylic acid with an epoxidized hydrocarbon resin such as one prepared wholly or in part from a diene; and acrylyl epoxy prepolymers, such as those formed by reacting a bisphenol A-epichlorohydrin type of epoxy resin with 2 moles of acrylic acid. The acrylyl terminated prepolymers can also be polyacrylates, such as the di- and polyacrylates, the di- and polymethacrylates and the di- and polyitaconates of neopentyl glycol, pentaerythritol, glycerine, triethylene glycol, tetraethylene glycol, tetramethylene glycol and trimethylolpropane e.g., trimethylolpropane triacrylate, trimethylolpropane diacrylate, trimethylolpropane trimethacrylate, trimethylolethane triacrylate, tetramethylene glycol dimethacrylate, ethylene glycol dimethacrylate, triethylene glycol dimethacrylate, diethylene glycol diacrylate, penaerythritol triacrylate, tetraethylene glycol diacrylate, tetraethylene glycol dimethacrylate and the like.

Component (B)

The melamine acrylate is miscible with the above-described acrylyl terminated prepolymers and subsequently functions as a cross-linking agent upon actinic irradiation in the presence of a suitable actinic radiation sensitive polymerization initiator. Due to the acrylyl nature of the unsaturation of the alkyl acrylate melamine ethers, rapid cross-linking is achieved upon exposure to actinic irradiation. Furthermore, the several cross-linking sites in alkyl acrylate melamine ethers contribute hardness and toughness to the resulting coatings. The melamine acrylates are alkyl acrylate melamine ethers that can be chemically represented as the transetherification reaction products of poly(lower alkoxymethyl) melamines, which can be an N-substituted poly(alkoxymethyl) melamine wherein up to three of the amino hydrogen atoms are replaced with alkyl, cycloalkyl, acryl or acyl groups containing 1 to 6 carbon atoms, and a hydroxyalkyl acrylate or lower alkacrylate represented by the formula:

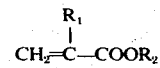

wherein $R_1$ is a member selected from the group consisting of H, halogen, and lower alkyl groups containing 1 to 4 carbon atoms, and $R_2$ is a monohydroxylsubstituted alkyl group containing 1 to 4 carbon atoms. Preferably, for efficiency and economy in rapid curing, $R_1$ is H. It has been observed that where $R_1$ is H, curing is about 2 to 3 times faster than a similar alkyl acrylate melamine ether where $R_1$ is an alkyl group such as methyl. This chemical representation of the alkyl acrylate melamine ethers also includes the ethers of polymethylolmelamines, which can be an N-substituted polymethylol melamine wherein up to three of the amino hydrogen atoms are replaced with alkyl, cycloalkyl, aryl or acyl groups containing 1 to 6 carbon atoms and the hydroxyalkyl acrylates, herein described. Such hydroxy alkyl acrylates include 2-hydroxyethyl acrylate, 2-hydroxyethyl methacrylate, 2-hydroxypropyl acrylate, 2-hydroxypropyl methacrylate, 2-hydroxy 3-chloropropyl acrylate, 2-hydroxypropyl methacrylate, and the like. The preferred melamine acrylates are formed by the reaction of a poly-(primarily hexa- and penta-) (methoxymethyl)melamine and dimers and trimers thereof with a hydroxyalkyl acrylate. It has been found that the presence of an appreciable amount of unreacted acrylate ester in the resin solution is not detrimental to the subsequent coating process. Also included within the term alkyl acrylate melamine ethers are those ethers where one of the amino group of melamine used in forming the alkyl acrylate melamine ethers is replaced with a hydrocarbyl group such as phenyl. Such a substituted melamine is commercially available under the name of benzoguanamine. The resulting acrylate ethers are included within the term alkyl acrylate melamine ether.

The poly(alkoxyalkyl) melamine ethers useful as starting materials in the transetherification reaction whereby the alkyl acrylate melamine ether required in this invention can be formed frequently contain a small (typically 10 to 20) per centage of low polymers or oligimers. During the transetherification reaction whereby the acrylate or lower alkacrylate functionality is incorporated, such as in the procedure outlined in part A of Example 1 below, the fraction of the product present as low polymer or oligmer can be increased to the point where less than half the product is present in monomeric form. These partially polymerized forms are advantageous in that shrinkage, embrittlement and stress cracking arising from slow post-cure polymerization reactions involving the residual alkoxyalkyl groups and liberating alcohol are minimizied because some of those reactions have already taken place during the preparation of the photopolymerizable composition. Because of the higher average degree of polymerization of the uncured composition and the increased number of photomerizable cross-linking groups per molecule, cure is more rapid with the predominately oligermic forms than with the predominately monomeric forms. All of the these effects are particularly important where a high percentage of the polymerizable composition is alkyl acrylate melamine ether.

The degree of acrylate or lower alkyacrylate substitution can usefully be varied from an average value of about 2 per triazine ring to an average value of slightly less than 6 per triazine ring. When prepared from poly-(alkoxyalkyl) melamine ethers by transetherification with hydroxyalkyl acrylates or hydroxyalkyl lower alkacrylates, the degree of such substitution can be influenced by varying either the degree of alkoxyalkyl substitution or the amount of hydroxyalkyl acrylate supplied to the transetherification reaction process or both. Higher degrees of acrylate substitution permit less melamine to be used in the polymerizable composition without sacrifice of the rate of cure. This is particularly important where the properties desired in the final cured film are interferred with by higher concentration of the melamine component. Also, post-cure polymerization reactions involving the alkoxyalkyl groups liberating alcohol and leading to shrinkage, embrittlement and stress cracking are reduced by increasing the extent of transetherification with the less reactive alkylacrylate or alkylalkacrylate groups. Alkyl acrylate melamine ether containing an average of more than 3 acrylate or lower alkacrylate groups per triazine ring are particularly advantageous.

Additional melamine acrylates that are suitable for the present purposes are described in U.S. Pat. No. 3,020,255, and the publication entitled "Synthesis of Monomers from Hydroxyethyl Acrylate and Methylolmelamine which Polymerize by Low Doses of Radiation" by T. J. Giacobbe, R. H. Yocum, and E. B. Nyquist appearing in the September-October, 1971, issue of *Macromolecules*, the disclosures of which are incorporated by reference. The *Macromolecules* article is also of interest in that it disclose the self-curing of melamine acrylates under the influence of high energy ionizing electron irradiation, but does not concern crosslinking with acrylyl prepolymers under ultraviolet irradiation. U.S. Pat. No. 3,020,255, referred to above, discloses only thermally activated polymerization reactions of the melamine acrylates and related compounds with which it is concerned.

Component (C)

When the mixture of the acrylyl terminated prepolymer (component (A)) and the melamine acrylate (component (B)) is not of a suitable viscosity for the application intended, monoethylenically unsaturated polymerizable diluents which form homogenous mixtures therewith and are copolymerizable therewith by actinic irradiation in the presence of a suitable actinic radiation sensitive polymerization initiator can be blended therewith to lower the viscosity. Suitable compatible polymerizable diluents include such monomers as vinyl aromatic hydrocarbons (e.g., styrene, vinyl toluene, or α-methyl styrene) acrylic and methacrylic acid esters, such as alkylacrylates including methyl acrylate, methyl methacrylate, ethyl acrylate, ethyl methacrylate, propyl acrylate, propyl methacrylate, isobutyl acrylate, isobutyl methacrylate, butyl acrylate, butyl methacrylate, 2-ethylhexyl acrylate, 2-ethylhexyl methacrylate, decyl acrylate, decyl methacrylate, isodecylacrylate and isodecyl methacrylate, alicyclic acrylates including cyclohexyl acrylate and cyclohexyl methacrylate, aryloxyalkyl acrylate, including phenoxyethyl acrylate; alkoxyalkyl acrylates including butoxyethoxy acrylate, alkoxyalkoxyalkyl acrylates including butoxyethoxy-ethoxy acrylate, alkylcarbamyl alkyl acrylates and methacrylates including methylcarbamylethyl acrylate, methylcarbamylethyl methacrylate, methylcarbamylpropyl acrylate, methylcarbamylpropyl methacrylate, arylacrbamylalkyl acrylates, phenylcarbamylethyl acrylate, phenylcarbamylethyl methacrylate, phenylcarbamylpropyl acrylate and phenylcarbamylpropyl methacrylate, the reaction product of mono-epoxides, such as butyl, phenyl and cresyl glycidyl ether, with acrylic and methacrylic acids; itaconic acid esters; and N-vinylpyrolidone.

Component (D)

Practically any initiator of addition polymerization which is capable of initiating polymerization of ethylenically unsaturated units in response to exposure to actinic radiation can be used in the photopolymerizable compositions of this invention. Such initiators should be dispersible in the compositions to the extent necessary for initiating the desired polymerization under the influence of the amount of actinic light energy absorbed in relatively short term exposures. These initiators are useful in amounts from 0.01 to 5% or more and preferably from 0.1 to 2.0% based on the weight of the total polymerizable composition.

Suitable photopolymerization initiators include vicinal ketaldonyl compounds (i.e., compounds containing a ketone group and an aldehyde group) such as diacetyl, benzil, 2,3 pentanedione, 2,3 octadione, 1-phenyl-1, 2 butanedione, 2,2 dimethyl-4-phenyl-3,4 butandione, phenyl glyoxal, diphenyl triketone; aromatic diketones, such as anthraquinone; acyloins, such as benzoin and pivaloin acryloin ethers, such as benzoin methyl ether, benzoin ethyl ether, benzoin butyl ether, benzoin isobutyl ether, benzoin phenyl ether; alpha-hydrocarbon substituted aromatic acyloins, including alpha-methyl methyl benzoin, alpha-alkyl benzoin, as in U.S. Pat. No. 2,722,512, and phenylbenzoin; diaryl ketones, such as benzophenone and dinaphthyl ketone; and organic disulfides, such as diphenyldisulfide. Optionally, the initiators can be chemically combined with components (A), (B), or (C) as in U.S. Pat. No. 3,429,852 and U.S. Pat. No. 3,565,779, the disclosures of which are incorporated by reference. The initiator may also include a synergistic agent, such as a tertiary amine, with the primary photosensitive compound to enhance the conversion of photoabsorbed energy to polymerization initiating free radicals.

The photopolymerizable coating binder composition can also contain conventional additives, such as flow control and leveling agents, organic and inorganic dyestuffs and pigments, fillers, plasticizers, lubricants, and reinforcing agents, such as alumina, silica, clay, talc, powdered glass, carbon black, fiberglass and the like so long as the propagation of the actionic radiation initiated polymerization is not substantially impaired. For opacified coatings, gas bubble opacification in accordance with the copending U.S. application Ser. No. 197,981, filed Nov. 11, 1971, and now abandoned can be employed. For clear cotaings, the binder composition described above can be used without additional ingredients.

The radiation curable compositions of the present invention are particularly suited for use as plastic floor tile coating, metal container coatings, appliance and automotive coatings, wood and particle board coatings, concrete and cement formboard coatings, in addition to other uses, such as adhesives, particularly in the laminating art; coatings for paper, metals, plastics, leather, textiles, fiberglass and glass; and similar surfaces; vehicles for printing inks, lacquers, and paints; and in the preparation of photopolymerizable elements, i.e., a support having disposed thereon a photopolymerizable layer of a composition.

In coating substrates in accordance with the process of the present invention, the actinic light curable composition is applied to the substrate as a liquid solution in any conventional manner, as by spraying, brushing, dipping, roll coating, and the like. In the usual practice a thin film of the photopolymerizable blend is applied to the top side of a sheet form substrate to be coated which is positioned to travel on a conveyor and pass under a source of actinic radiation. As stated above, the choice of the substrate is not part of the invention and can be any material, such as wood, metal, plastic, fiberglass, asbestos, ceramic, glass, particle board, fiberboard, and so on.

The coated side of the substrate is then exposed to actinic radiation for a time sufficient to effect the polymerization and to convert the composition into a hard, tough, adherent coating on the substrate.

The term "actinic radiation" is used here in its conventional sense and can be from any source for use in practicing the invention. The light can emanate from point sources or be in the form of parallel rays or convergent or divergent beams. Inasmuch as the free radical generating, addition polymerization initiators generally exhibit maximum sensitivity in the ultraviolet range (i.e., 1,600 angstroms to 4,000 angstroms), the actinic light source should furnish an effect amount of such radiation, although actinic radiation in the range of about 1,600 to about 4,800 angstroms is generally effective for the present purposes. Effective sources include carbon arcs, lasers, mercury vapor arcs, fluorescent lamps with ultraviolet light emitting phosphors, argon glow lamps and sun lamps, photographic flood lamps, and plasma arc lamps, such as disclosed in U.S. Pat. No. 3,364,387, the disclosure of which is incorporated by reference. Of these, mercury vapor arcs, fluorescent sun lamps, lasers, and plasma arc lamps are most suitable. Lasers tuned to the specific wavelengths of optimum photoinitiator sensitivity are particularly preferred.

Variables determining the rate at which a photopolymerizable composition will cure include the specific ingredients in the composition, concentration of the photoinitiators, thickness of the material, frequency and intensity of the actinic radiation, the presence or absence of a sensitizer synergist, such as a tertiary amine, the presence or absence of oxygen (i.e., the coating polymerizes faster in the absence of oxygen) and the ambient temperature. The compositions of the invention can be used in relatively thick layers or can be cast as thin films having thicknesses of from about 0.1 to 150 mils, and preferably about 0.2 to 10 mils. Distances of the source of actinic radiation from the work usually range from about one-fourth inch to several feet or more, depending on the optics of the system. The speed of cure can often be increased by reducing the temperature of the coating prior to cure.

Depending on the intensity of the actinic radiation the photopolymeriable compositions of this invention usually require from a few milliseconds to a few minutes exposure to achieve satisfactory cure when in thin films. For efficiency and economy, an intensity of the actinic radiation in the range of 0.1 to 5 kilowatts per square foot of coating to be cured is preferred. In the case of lasers and other sources of actinic radiation emitting radiation having a substantial portion of its energy in frequencies of optimum sensitizer sensitivity, the intensity can be appreciably lower. Because in many practical applications, such as the use of photopolymerizable compositions in coatings or in printing inks, exclusion of oxygen is difficult and/or expensive to achieve, materials can be added to the photopolymerizable composition which are compatible therewith and which will reduce the polymerization-inhibiting effect of oxygen. Such materials include, for example, allylic compounds which are known to air dry. The inhibiting effect of atmospheric oxygen can also be reduced by incorporating oils or waxes which float to the surface of the wet film and impede the absorption of oxygen.

Typically, the coated workpieces for curing are passed transversely to the beam of actinic radiation by means of a conveyor, if the substrate is piece goods, or as a continuous strip, if the substrate being coated represent self-supporting stock such as metal coil stock. It is sometimes advantageous for completeness of cure and speed of curing to maintain a substantially inert atmosphere about the workpieces during their irradiation, e.g., by a purge of nitrogen or other inert gas. Where it is desirable to induce fusion or flow of a coating, followed by a polymerizing cure of the type provided by use of the instant invention, it can be advantageous to first heat the coating or substrate by a conventional method, e.g., convection, electrical induction, source of infrared energy, etc., and then follow this with the actinic irradiation. Accordingly, coatings such as polymerizable powder coatings can be cured effectively to yield smooth, continuous films.

The following examples show way in which this invention can be practiced, but should not be construed as limiting it. Unless otherwise, specifically stated, all parts herein are parts by weight, all percentages are weight percentages, and all temperatures in degrees Fahrenheit.

EXAMPLE 1

PART A

Preparation of an Acrylyl Terminated Prepolymer

In a stirred, heated reaction vessel 30.19 pounds of isophorone diisocyanate (3-isocyanatomethyl-3,5,5-trimethyl cyclohexyl isocyanate having a molecular weight of 222.3) are charged at a temperature of 140°F. under an air sparge with moderate agitation. 4.0 grams of dibutyl tin dilaurate (catalyst) are then added. 8.01 pounds of 1,6 hexanediol at 140°F. are then slowly added over a 10-hour period to the reaction vessel with agiation. This reaction product is an isocyanate terminated urethane oligomer.

7.47 pounds phenoxyethyl acrylate (ethylenically unsaturated diluent) and 9.23 grams of methyl ether of hydroquinone (inhibitor) are added to the reaction mixture to reduce viscosity.

The temperature of the reaction mixture is then brought to 175° to 180°F. with agitation and 29,27 pounds of 2-hydroxyethyl acrylate are added over a period of about 4 hours. At the end of this period, the reaction product is a water white, viscous liquid solution of urethane oligomer diacrylate in phenoxyethyl acreylate.

PART B

Preparation of the Unsaturated Melamine Acrylate Resin

Into a suitable reaction vessel equipped with a thermometer and stirrer are changed 13 parts of hexamethoxymethyl melamine (0.033 moles), 24 parts of 2-hydroxyethyl acrylate (0.2 moles), 0.13 parts of toluene sulfonic acid, and 0.018 parts of the methyl ether of hydroquinone. An air sparge is begun through the reaction mixture and 25 inches of vacuum is applied to the reaction vessel to assist in the removal of volatiles. The reaction mixture is stirred while the temperature is raised to between about 145°F. and about 165°F. This temperature is maintained for about one to four hours after which the reaction product (a water white, viscous liquid) is cooled to room temperature. The weight fraction of monomeric melamine compound is reduced from about 85% in the starting material to about 30 to 50% in the product, as shown by gel permeation chromatography.

PART C

Preparation and Application of the Actinic Light Curable Coating Composition

Thirty parts of the diacrylyl terminated prepolymer of Part A, 15 parts of the unsaturated melamine acrylate resin of Part B, 10 parts of 2-hydroxyethyl acrylate, 40 parts of phenoxy ethyl acrylate, 5.4 parts of silica flatting agent (Syloid 74, a precipitated silcia having an average particle size of about 10 to 11 microns, sold by Davison Chemical Company, a division of W. R. Grace and Company), 3.2 parts of pigment grade $Al_2O_3$, and 2 parts of the butyl ether of benzoin are blended together at room temperature to form a coating composition.

A conventional vinyl-asbestos composition for forming vinyl floor tiles is extruded from a heated extrusion chamber in the form of a sheet about one-eighth in thickness. The sheet is immediately passed through a conventional roll coater at the rate of 200 feet per minute where the above-described coating composition is applied at a thickness of 2 to 3 mils. The coated sheet is then immediately passed under a source of ultraviolet radiation.

The source of ultraviolet radiation is a plasma arc radiation torch optically directed by a reflector system to irradiate the freshly coated sheet workpiece passing below a rectangular irradiation window on an enclosed, horizontal conveyor moving at 200 feet per minute (providing about 0.1 second of irradiation). The atmosphere around the workpiece during its irradiation is kept essentially inert by purging it with nitrogen. Radiation energy supplied by such apparatus at the workpiece surface is about 35 kilowatts per square foot, with about 10% of this radiation being in the ultra-violet spectrum. A torch of this type is described in U.S. Pat. No. 3,364,387.

At the end of this radiation curing treatment, the vinyl asbestos sheet has a clear, hard, tough, non-yellowing, chemically durable coating thereon of about 2 mils thickness. The coated vinyl asbestos sheet is cut into one foot squares and is ready for use in floor tile applications.

Coated floor tiles made by the procedure of this example were subjected to occasional water splashes at room temperature and humidity for a period of several days. After this period, the amount of "curl" was determined by measuring the perpendicular distance from a line joining two opposite corners of the square. The average distance for the samples was well below the 30-mil distance allowed by U.S. Government specification SS-T-312.

Several of the floor tiles were also subjected to repeated cleansing with conventional household cleaning fluids. Even after several of such cleansings, the floor tiles had not "yellowed" or stained. To test the hardness of the coating on the floor tiles, attempts were made to scratch the coating by forcefully rubbing the edge of a 1964 nickel coin against it. The edge of the coin could not be made to penetrate the coating.

Similar results are obtained when the Example is repeated, but the melamine acrylate of Part B is replaced with a molar equivalent of a benzoguanamine acrylate prepared as follows: A benzoguanamine acrylate resin is prepared by reacting 1,392 grams of tetramethoxymethyl benzoguanamine, 1,856 grams of 2-hydroxyethyl acrylate, 33 grams concentrated sulfuric acid, in the presence of 1.6 grams of hydroquinone. All of the reactants except the sulfuric acid are charged into a five liter flask equipped with a stirrer The batch is continuously sparged with air while the sulfuric acid is added over a 5-minute period. The pressure in the reaction flask is reduced to 125 mm. of Hg. The batch is maintained at 162°F. over a period of four hours while the volatiles are distilled over. At the end of this period, clear water white reaction product having a viscosity of Gardner Holt I is obtained.

EXAMPLE 2

This example demonstrates the use of acrylyl modified polyester prepolymers cross-linked with ultraviolet radiation as sealers for wood. Such coatings are suitable for use alone, or are capable of accepting a top coat, such as a urethane.

A coating composition is formed by blending together 37 parts of a polyester formed by reacting 2 moles of phthalic anhydride with one mole of propylene glycol and then reacting this reaction product with 2 moles of glycidyl acrylate; 16 parts of a melamine acrylate resin formed by reacting one mole of hexamethoxymethyl melamine with 3 moles of 2-hydroxyethyl acrylate; 18 parts of hydroxyethyl acrylate; 18 parts of phenoxyethyl acrylate; 4 parts of toluene; 2 parts of n-butyl benzoin ether; and 4 parts of finely divided talc.

The above coating composition is applied to and cured on a plywood substrate at a thickness of 2 to 3 mils by the method of Example 1 to form a tough, hard, chemically durable coating thereon. The coated plywood is suitable for use as is for construction application, or it can be further coated for special applications, such as in formboard release coatings.

EXAMPLE 3

This example demonstrates the application of the present invention to release coatings for reusable plywood formboards used as molds in cement work. The coating renders the formboard suitable for repeated reuse. These coatings are essentially 100% reactive and are cured by ultraviolet radiation.

Thirty-six parts of an acrylyl terminated urethane prepolymer formed by reacting one mole of tetraethylene glycol with 2 moles of toluene diisocyanate and then reacting this reaction product with 2 moles of 2-hydroxyethyl acrylate; 26 parts of a melamine acrylate cross-linking agent formed by reacting one mole of hexamethoxymethyl melamine with 3 moles of 2-hydroxyethyl acrylate; 9 parts of hydroxyethyl acrylate; 27 parts of phenoxyethyl acrylate; and 2.2 parts of n-butyl ether of benzoin are blended together to form a coating composition.

This coating is applied as a top coat over a plywood substrate which has been sealed in accordance with Example 2. The coating is applied at the thickness of 1 to 2 mils and cured by the method of Example 1. The resulting coating plywood has a tough, hard, chemically durable coating that releases quite easily from freshly hardened concrete. The coated plywood is suitable for repeated use in concrete molding applications without substantial deterioration of the coating and without adhesion between the concrete and the coating.

EXAMPLE 4

An acid-terminated diester is formed by reacting 2 moles of phthalic anhydride with one mole of propylene glycol. The diester is then reacted with 2 moles of glycidyl acrylate to form an acrylyl terminated polyester.

A coating composition is formed by blending 40 parts of this acrylyl terminated polyester with 10 parts of an alkyl acrylate melamine ether formed by reacting one mole of hexamethoxymethylmelamine with 3 moles of 2-hydroxyethyl acrylate; 20 parts of 2-hydroxyethyl acrylate, 30 parts of phenoxyethyl acrylate; and 2 parts of benzophenone. The coating is applied to an aluminum sheet at a thickness of 1 mil and cured by the method of Example 1 to form a clear coating. The aluminum sheet is then worked to form end pieces for metal beverage cans. Cans are then fabricated with the coated ends exposed. The coating is observed to be tough and flexible and is quite resistant to abrasions and scuffing received in service.

Similar results are obtained when 40 parts of a trimer fatty acid triacrylate prepolymer formed by reacting one mole of trimerized $C_{18}$ unsaturated fatty acid with 3 moles of glycidyl acrylate are substituted for the acrylyl terminated polyester in the above procedure.

EXAMPLE 5

An acrylyl terminated urethane prepolymer is formed by reacting one mole of isophorone diisocyanate with 2 moles of 2-hydroxyethyl acrylate. A coating composition is formed by blending 30 parts of this acrylyl terminated urethane prepolymer with 15 parts of the melamine acrylate of Example 1; 5 parts of trimethylolporpane tricrylate formed by reacting one mole of trimethylolpropane with 3 moles of acrylic acid; 20 parts of phenoxyethyl acrylate; 10 parts of 2-hydroxyethyl acrylate; and 2 parts of anthraquinone.

The coating composition is applied by roller coating at a thickness of 3 to 5 mils to a conventional particle board substrate having a wood grain overlay thereon. The coating is cured by exposure to ultraviolet radiation to form a tough, hard, stain-resistant coating on the particle board substrate which is quite suitable for use in making desks, tables, counter tops, and other types of inexpensive furniture. The trimethylolpropane triacrylate enhances toughness of the resulting coating.

Similar results are obtained when 40 parts of an acrylyl terminated amide prepolymer formed by reacting 2 moles of maleic anhydride with one mole of ethylene diamine followed by subsequent reaction with 2 moles of glycidyl acrylate is substituted for the acrylyl terminated urethane prepolymer in the above procedure.

The above coating can be pigmented with pigments, such as anastase $TiO_2$ or carbon black, if desired, although it must be appreciated that the presence of pigments has a tendency to retard the curing.

EXAMPLE 6

An acrylyl terminated epoxy prepolymer is formed by reacting the equivalent of one mole of an epichlorohydrin/bisphenol A type of liquid epoxy resin, having an epoxide equivalent to 170 to 200 and an average molecular weight of 340 to 400, with 2 moles of acrylic acid to form an acrylyl terminated epoxy prepolymer. A white coating composition is formed by blending 30 parts of the above acrylyl terminated epoxy prepolymer, 30 parts of melamine acrylate formed by the acid catalyzed etherification of one mole of hexamethylolmelamine with 3 moles of 2-hydroxyethyl acrylate; 10 parts of 2-hydroxyethyl acrylate; 30 parts of phenoxyethyl acrylate; 2 parts of the n-butyl ether of benzion; and 15 parts of anatase pigment grade $TiO_2$.

The coating composition is applied by silk screen stencil technique to form a trademark symbol on an acrylonitrile-butadiene-styrene type of plastic workpiece. The stenciled workpiece is exposed to the ultraviolet light emitting from the plasma torch described in Example 1 for about one second at room temperature. At the end of this period the plastic workpiece has a white, hard, permanent, durable abrasion-resistant trademark symbol imprinted thereon.

When a black trademark symbol is desired, 15 parts of pigment grade carbon black are substituted for the anatase pigment in the above procedure.

EXAMPLE 7

An acrylyl terminated urethane prepolymer is formed by reacting one mole of isophorone diisocyanate with 2 moles of 2-hydroxyethyl acrylate. Forty-one parts of this acrylyl terminated urethane prepolymer are blended with 16 parts of a melamine acrylate formed by reacting one mole of hexamethoxymethyl melamine with 3 moles of 2-hydroxyethyl acrylate; 26 parts of 2-hydroxyethyl acrylate; 16 parts of cyclohexyl acrylate; and 2 parts of n-butyl ether of benzoin to form a coating composition. The coating is applied at 1 to 2 mils thickness by brushing as a clear protective overcoating on appliance nameplates.

The coating is cured by exposure to the ultraviolet radiation from the plasma torch described in Example 1. The coating is clear, tough and stain-resistant. Similar results are obtained when benzoin, benzophenone or diacetyl are substituted for the n-butyl ether of benzoin in the above procedure.

EXAMPLE 8

A coating composition was prepared by blending 70 parts of the melamine acrylate resin of Part B of Example 1, 30 parts of diethyleneglycol diacrylate, and 2 parts of the n-butyl ether of benzoin. This coating composition was then applied to a steel panel with a number 30 wire wound rod.

The coated panel was cured by placing the panel 3 feet from a plasma arc radiation source (similar to the one in Example 1, except that the radiation intensity was 18 KW per square foot). The resulting coating was hard, clear, tack-free, and mar-resistant.

What is claimed is:

1. A coating composition polymerizable by actinic radiation which comprises in parts by weight the following components:
   A. about 10 to 70 parts of an acrylyl terminated prepolymer having a molecular weight from about 170 to about 30,000;
   B. about 5 to 75 parts of an alkyl acrylate melamine ether containing an average of more than 3 acrylate or lower alkacrylate groups per triazine ring and miscible with the acrylyl terminated prepolymer;
   C. about 0 to 75 parts of a monoethylenically-unsaturated viscosity-reducing dilutent miscible with, and copolymerizable under actinic irradiation with, the prepolymer and the melamine ether; and
   D. an actinic radiation-sensitive polymerization initiator in an proportion effective for initiating polymerization of said components (A), (B) and (C) upon exposure of said composition to actinic radiation, said proportion being from about 0.01 to 5 parts;

wherein said parts of said components (A), (B), (C) and (D) total 100.

2. The composition of claim 1 wherein said alkyl acrylate melamine ether is predominately in the form of oligimers.

3. A process for coating an article comprising applying to the surface of the article a film of the composition of claim 1 and then exposing said film to actinic radiation to polymerize said film to a hard, adherent coating.

4. A product of the process of claim 3.

* * * * *